S. R. SEESE.
LICENSE CERTIFICATE DISPLAY CASE.
APPLICATION FILED FEB. 21, 1921.
1,392,661. Patented Oct. 4, 1921.
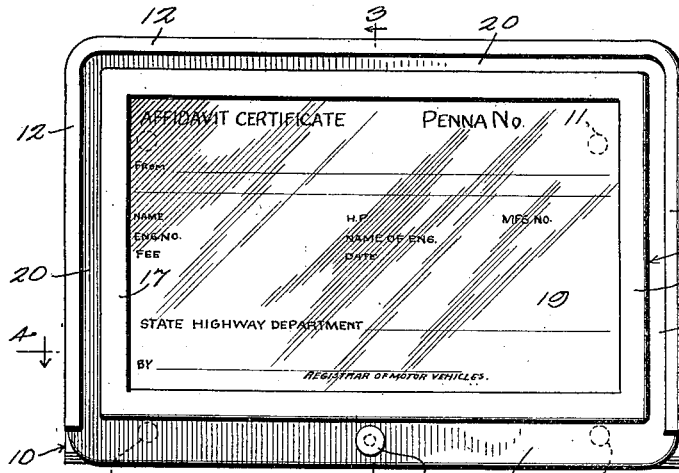
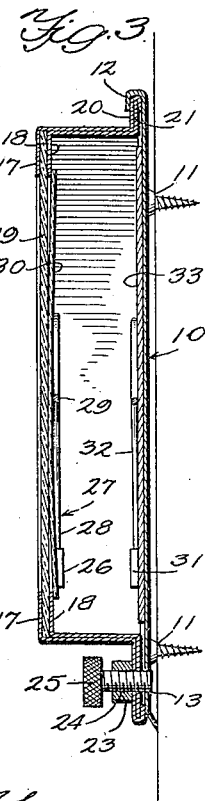
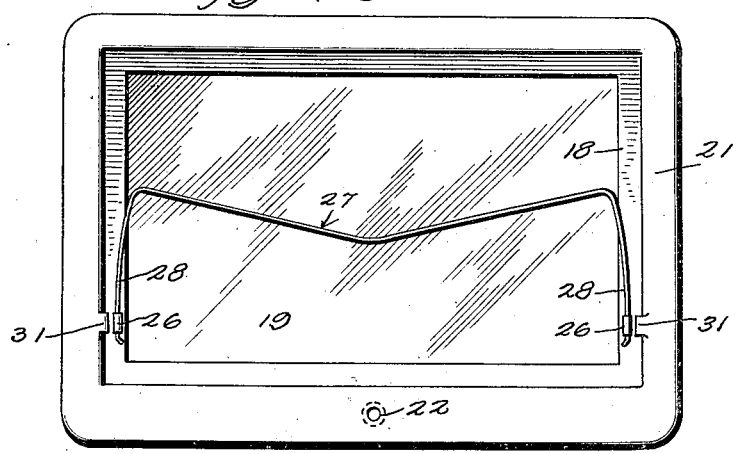
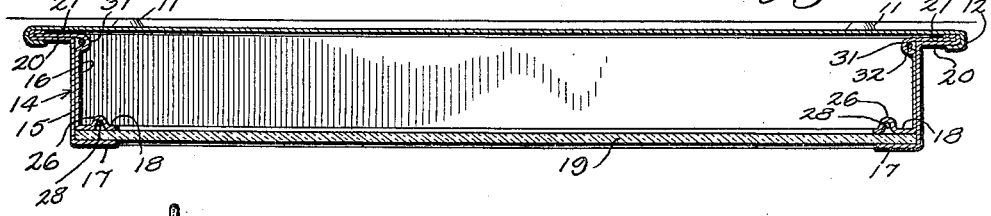
Inventor
Samuel R. Seese,
By *Ch. Farlten*
Attorney

UNITED STATES PATENT OFFICE.

SAMUEL R. SEESE, OF VANDERBILT, PENNSYLVANIA.

LICENSE-CERTIFICATE-DISPLAY CASE.

1,392,661.  Specification of Letters Patent.  Patented Oct. 4, 1921.

Application filed February 21, 1921. Serial No. 446,685.

*To all whom it may concern:*

Be it known that I, SAMUEL R. SEESE, a citizen of the United States, residing at Vanderbilt, in the county of Fayette and State of Pennsylvania, have invented certain new and useful Improvements in License-Certificate-Display Cases, of which the following is a specification.

This invention relates to license certificate display cases and the like, and it comprises a base plate adapted for attachment to the instrument board of an automobile or other suitable support, a casing removably secured to the base plate and having its outer face provided with a glass through which is displayed a certificate or the like, the casing being provided with sockets for the reception of the ends of a novel form of spring whereby the certificate or the like may be held firmly against the inner face of the glass.

The laws of some States require that a certificate of ownership of an automobile be carried thereon briefly describing the automobile and the name of the person to whom the license has been issued, in order that it may be readily displayed upon request. These certificate cards are usually tacked or otherwise attached upon the instrument board or other part of the automobile in such a manner that they are often lost or stolen.

An important object of the present invention is to provide novel means for displaying the certificate card whereby it may be detached when desired as, for instance, when the automobile is left standing.

Other objects and advantages of the invention will be apparent during the course of the following description.

In the drawings forming a part of this specification, I have illustrated one embodiment of the invention. In this showing—

Figure 1 is a face view of the device assembled,

Fig. 2 is a rear face view of the casing detached,

Fig. 3 is a section taken on the line 3—3 of Fig. 1,

Fig. 4 is a section taken on the line 4—4 of Fig. 1, and

Fig. 5 is an edge view of the spring element.

In the drawings, wherein for the purpose of illustration is shown a preferred embodiment of the invention the numeral 10 designates a base plate as a whole provided with counter-sunk openings 11, for the reception of screws or other attaching means whereby the base plate may be attached to the instrument board or other part of the automobile. As shown in Fig. 1, the base plate 10 is provided with inturned flanges 12, on the top and two sides, spaced from the body portion of the base plate to form guide ways as shown in Figs. 3 and 4, for a purpose to be described. The base plate 10 is provided near its lower edge with a screw threaded opening 13.

The numeral 14 designates a casing formed of two separate plates of metal or other material and includes side walls 15 and 16. The side walls 15 and 16 have their outer edges turned inwardly to form flanges 17 and 18. The flanges 17 and 18 are spaced as shown in Figs. 3 and 4 to provide a socket for the reception of a glass or other transparent element 19. The side walls 15 and 16 are provided at their inner ends with outturned flanges 20 and 21, the flange 20 being formed wider than the flange 21 and doubled back over the edge of the latter, as shown in Figs. 3 and 4. In assembling the casing is formed as shown except that the flange 20 has its outer end formed without being bent back as shown. It will be apparent that the glass 19 may be placed in position in the outer wall of the casing, and the inner wall then applied, the end of the flange 20 being bent back upon the flange 21 as shown whereby the two casing sections are secured together and the glass secured in position.

As shown in Figs. 1 to 3 inclusive the flanges 20 and 21 extending outwardly from the lower walls of the casing are wider than on the other three sides. These lower flanges are provided with registering screw threaded openings 22, and the outer flange has secured thereto by brazing or the like, a collar 23 having a screw threaded opening 24 registered with openings 22. A screw 25 preferably provided with a knurled head is adapted to be mounted in the openings 22 and 24 and since the latter openings register with the opening 13 of the base plate 10, it will be apparent that by turning the screw 25 inwardly the inner end thereof will enter the opening 13.

As shown in Figs. 2, 3, and 4, the side flanges 18 are provided with sockets 26 preferably formed by stamping the metal of the flange inwardly as shown in Fig. 4. A substantially M shaped spring 27 is provided, the ends of the legs 28 thereof being adapted for insertion within the sockets 26. The central portion 29 of the spring and the lower ends of the legs are bent outwardly as shown in Fig. 5. It is apparent that when the lower ends of the legs 28 are flexed for insertion within the sockets 26 the spring will exert a tension against the certificate card when the latter is in position against the glass 19, as shown in Fig. 3, the certificate card being designated by the reference character 30. The center of the spring 29, also exerting an outward tension causes the entire upper part of the spring 27 to contact and press against the certificate card 30, throughout the width thereof to hold it firmly in position.

The numeral 31 designates a pair of sockets formed in the side walls 16, similar to the sockets 28. The sockets 31 are adapted to receive the ends of a spring 32, Fig. 3. The spring 32 is formed similar to the spring 27 and is adapted to hold a map card 33 or the like firmly in engagement with the inner face of the base plate 10.

Since the guide member 12 extends only around three sides of the base plate, the lower end thereof being open, it will be apparent that when desired the screw 25 may be withdrawn from engagement with the opening 13 in the base plate 10, and the casing withdrawn from the lower end of the base plate 10. It will be apparent also that the casing may be replaced when desired by simply inserting it from the lower end of the base plate and turning the screw 25 so that the lower end thereof engages within the opening 13, whereby the casing may be firmly held in position with respect to the base plate.

It is to be understood that the form of my invention herewith shown and described is to be taken as a preferred example of the same and that various changes in the shape, size and arrangement of parts may be resorted to without departing from the spirit of the invention or the scope of the subjoined claims.

What I claim is:

1. In a device of the character described, a casing including side walls and a transparent face, the walls of said casing being provided with integral stamped out sockets, and a spring having ends adapted for insertion within said sockets, said spring being normally projected toward the transparent face of said casing to hold a card thereagainst.

2. In a device of the character described, a casing including side walls and a transparent face, said casing being provided with integral stamped out sockets, and a substantially M shaped spring, the ends of the legs of said spring being adapted for insertion within said sockets, said ends and the center of said spring being normally bent toward said transparent face of the casing whereby pressure will be exerted toward said transparent face of the casing to hold a card thereagainst when the ends of the spring are mounted in said sockets.

3. In a device of the character described, a base plate having guide ways on three sides thereof, a casing formed of separate inner and outer sections, said sections including side walls, the outer portions of said walls being bent inwardly in spaced flanges to form a socket, a transparent member mounted in said socket, said casing terminating inwardly in outwardly extending contacting flanges, one of said last named flanges being longer than the other of said last named flanges and bent thereupon, said outwardly extending flanges being adapted to be received in the guide ways of said base plate, sockets formed in the inner walls of and integral with the inner section of said casing, and a spring having ends adapted for insertion within said sockets, said spring being normally projected toward the transparent face of said casing to hold a card thereagainst.

In testimony whereof I affix my signature in presence of two witnesses.

SAMUEL R. SEESE.

Witnesses:
A. E. WAGONER,
PAUL G. WAGONER.